Figure 1:
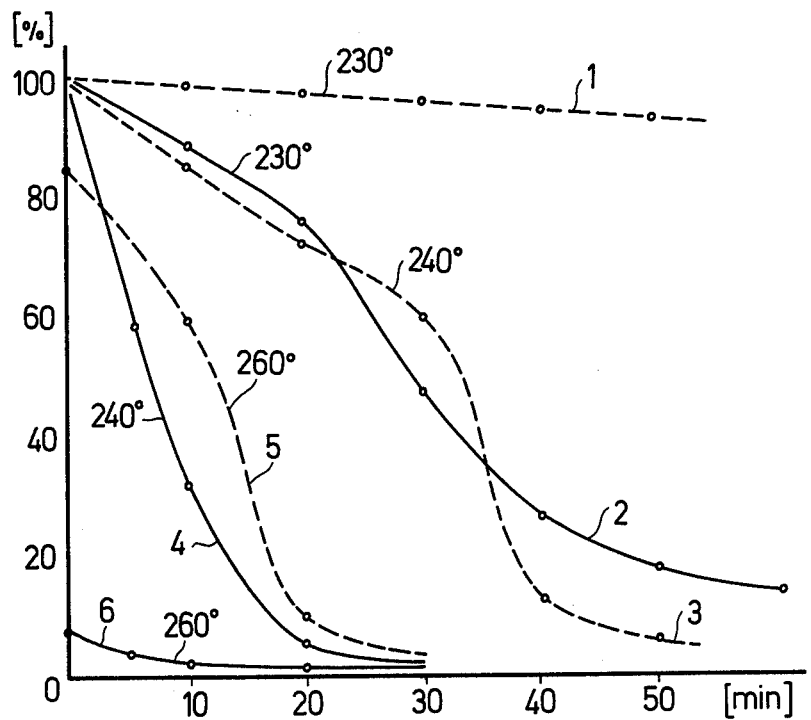

United States Patent [19]

Bóros et al.

[11] 4,091,071
[45] May 23, 1978

[54] PROCESS FOR DIGESTING GOETHITE-CONTAINING BAUXITES ACCORDING TO THE BAYER TECHNOLOGY

[75] Inventors: Jozsef Bóros, Ajka; Tibor Ferenczi, Tatabanya; Gyula Horváth; Ferenc Lazar, both of Budapest; László Lengyel; József Mátyasi, both of Almasfuzito; Maria Orban née Kelemen, Budapest; Tihamer Pintér, Budapest; György Sigmond, Budapest; Péter Siklósi, Budapest; Károly Solymár, Budapest; Béla Tóth, Ajka; István Vóros, Budapest; Kálman Wentzely, Almasfuzito; János Zámbo, Budapest; József Zóldi, Tatabanya, all of Hungary

[73] Assignees: Fémipari Kutató Intézet; Aluterv Aluminiumipari Tervező Vállalat, both of Budapest; Almásfúzitói Timföldgyár, Almasfuzito, all of Hungary

[21] Appl. No.: 643,670

[22] Filed: Dec. 23, 1975

[30] Foreign Application Priority Data
Dec. 24, 1974 Hungary .................. AU 330

[51] Int. Cl.² ........................... C01F 7/06
[52] U.S. Cl. ..................... 423/121; 423/131
[58] Field of Search ............ 423/121, 111, 131

[56] References Cited

U.S. PATENT DOCUMENTS

| | | | |
|---|---|---|---|
| 2,519,362 | 8/1950 | Flint et al. | 423/121 |
| 2,557,891 | 6/1951 | Porter | 423/121 |
| 2,926,069 | 2/1960 | Perrin et al. | 423/121 |
| 3,399,958 | 9/1968 | Brown | 423/121 |
| 3,737,514 | 6/1973 | King | 423/121 |
| 3,944,648 | 3/1976 | Solymar et al. | 423/121 |
| 4,026,989 | 5/1977 | Orban et al. | 423/121 |

FOREIGN PATENT DOCUMENTS

| | | | |
|---|---|---|---|
| 1,192,043 | 5/1970 | United Kingdom | 423/121 |
| 290,586 | 11/1929 | United Kingdom | 423/121 |

Primary Examiner—Herbert T. Carter

[57] ABSTRACT

The invention relates to an improved process for the production of alumina according to the Bayer technology, of bauxites containing goethite and especially of boehmitic or diasporic bauxites, for the acceleration of the digestion process, for the transformation of goethite into hematite, for the increase of alumina yield and for the reduction of the caustic soda losses, the essence of which consists in carrying out the digestion in the presence of 2–6% CaO and 0.2–2.0% $Mg^{++}$, $Fe^{++}$, $Mn^{++}$ $Co^{++}$ ions based on the weight of the dry bauxite or of compounds or ores containing these ions in the indicated quantities.

1 Claim, 3 Drawing Figures

PROCESS FOR DIGESTING GOETHITE-CONTAINING BAUXITES ACCORDING TO THE BAYER TECHNOLOGY

The invention relates to a process for the production of alumina according to the Bayer technology, of bauxites containing goethite and especially of boehmitic or diasporic bauxites, further for the acceleration of the digestion process, for the transformation of goethite into hematite, for the increase of the alumina yield and for the reduction of the caustic soda losses, the essence of which consists in that the digestion is carried out in the presence of 0.2–2.0 % $Mg^{++}$ and/or $Fe^{++}$ and/or $Mn^{++}$ and/or $Co^{++}$ ions reckoned upon the weight of the dry bauxite or of compounds and/or ores containing these ions in the indicated quantity.

The process can be advantageously used, smultaneously with the CaO-addition, also with digesting liquor containing NaCl and/or $Na_2SO_4$. The above mentioned bivalent ions are catalyzing the solubility of aluminium minerals and the transformation of goethite into hematite, the minimum required temperature of which can be reduced to 230° C and for the transformation even 20 minutes at 240° C and 2 minutes at 260° C are sufficient. The process can be highly advantageously used in the tube digesting equipment.

The above enumerated bivalent cations reduce by further 10% the losses of $Na_2O$ bound to the red mud, as compared with the technology applying CaO + $Na_2SO_4$-addition considered as optimum until now and increase by about 15% the fltering capacity of red mud.

The subject matter of the invention is a process for the recovery of goethite-containing bauxites according to the Bayer technology, and the intensification of the digestion process.

It is well known that the economy of the Bayer process producing the overwhelming majority of the alumina in the world is essentially determined by the alumina quantity to be obtained from the bauxite ($Al_2O_3$-yield) and by the caustic soda loss occurring with the processing. The economy is considerably influenced, however, also by the separability of the developing red mud. The separability and settling properties of red muds developing with the usual processing of goethite-containing bauxites are unfavourable and the Al-atoms incorporated by isomorphic substitution into the lattice of goethite reduce the $Al_2O_3$ yield.

Several processes are known for the reduction of caustic soda losses and for the elimination of drawbacks caused by the goethite. Thus, e.g. according to the French Pat. No. 1.280.089 the bauxites are recovered in the presence of finely ground (under 0.04 mm) CaO in a quantity of 2.5–6% reckoned upon the weight of the dry bauxite, whereby the total quantity of the diaspore becomes soluble. The feeding of CaO reduces simultaneously the $Na_2O$ content bound in the red mud. A usual practice in the Soviet alumina production consists in that in order to reduce the caustic soda losses not only the diasporic but also the boehmitic bauxites are recovered in the presence of about 3% CaO.

Already in 1968 it has been stated that the feeding of calcium oxide renders possible the solution of the aluminum content bound in the goethite since it behaves chemically similarly to the diaspore. (Proceedings of the Research Institute for Non-Ferrous Metals, Budapest, Vol. 9, p. 89–91). In the process according to the U.S. patent specification No. 3.737.514 the transformation of the goethite into hematite is carried out similarly by the digestion effected in the presence of calcium compound when the titanium compounds of the bauxite are transformed into calcium titanate.

The solution is also known where in order to reduce the silica content of sodium aluminate solutions, compounds, e.g. sodium halogenides, sodium carbonate or sodium sulfate, suitable for the production of sodalites, are fed (U.S. patent No. 2.519.362). According to the Hungarian patent of register No. 163.260 the partial substitution and reduction, respectively, of caustic soda losses can be effected by feeding sodium salts, when 10 to 12% of the total $Na_2O$ loss can be substituted by feeding NaCl and/or $Na_2SO_4$.

The process according to the British patent specification No. 1,382,980 is suitble for the acceleration, of the goethite-hematite transformation, and partial reduction and substitution of caustic soda losses, according to which the recovery is carried out in the presence of CaO and NaCl. Thereby the minimum temperature and molar ratio necessary for the goethite-hematite transformation can be reduced as compared to the technology using exclusively CaO-feeding. An essential further progress is provided for in the processing technology of goethite-containing bauxites by the process according to the U.S. Pat. No. 3,944,648 the essence of which consists in that the recovery of the bauxite is carried out in the presence of calcium compound corresponding to 2–6% CaO reckoned upon the weight of the dry bauxite and of sulfate salt corresponding to the concentration of 1–7.0 g/l sulfate ions.

The process according to the present invention means a considerable progress as compared to those said above since the transformation of the goethite content of the bauxite into hematite is ensured under more favourable conditions, in a shorter time, and at a lower temperature, respectively. Namely, when processing goethite-containing bauxites, the slowest chemical transformation determining the parameters of the entire digestion is the transformation of goethite into hematite. The essence of the present process consists in the use of additives catalyzing the digestion process which, in addition to the complete solution of the boehmite and diaspore contents, are effective also in the vicinity of the equilibrium molar ratio and can be used especially advantageously even in the presence of Ca-compounds and Ca-ions, respectively, and of sodium salts.

The theoretical basis of the present invention is formed by the recognition that the transformation of goethite into hematite occurs through the solution of goethite and the formation of intermediate complex compound and the velocity of the process is determined by the breaking of the goethite lattice, on the one hand, and by the composition of the formed intermediate complex compounds, on the other hand. With this respect the presence of bivalent cations is especially advantageous which promote the breaking of the goethite lattice in crystal chemical respect, as a consequence of their ion beams and coordination number which can infiltrate into the intermediate complex compound, respectively, and modify its properties. Such bivalent cations are $Mn^{++}$, $Fe^{++}$, $Co^{++}$, but also $Mg^{++}$ compounds can advantageously be fed either alone or together with $Ca^{++}$ compounds.

The invention is a process for recovering goethite-containing bauxites of boehmitic and diasporic type, according to the Bayer technology, for accelerating the digestion process, for transforming the goethite into hematite, for increasing the $Al_2O_3$-yield and for reducing the caustic soda losses, at a temperature of 180°–300° C, with aluminate liquor of 80–300 g/l $Na_2O_c$ concentration, containing 1–20 g/l NaCl and/or sulfate salt corresponding to a sulfate ion concentration of 1–7 g/l, in the given case feeding simultaneously calcium compound corresponding to 2–6% CaO reckoned upon the weight of the dry bauxite, in which process the digestion is carried out in the presence of compounds or ores containing $Mg^{++}$, $Fe^{++}$, $Mn^{++}$, $Co^{++}$ ions or their mixture. The feeding of the above compounds or ores containing bivalent ions is chosen corresponding to the composition of the bauxite and to the bond strength of the goethite present in the bauxite in such a way that their total quantity expressed in metal ions should be between 0.2 and 2.0% reckoned upon the weight of dry bauxite.

($Na_2O_c$ = caustic $Na_2O$ content = NaOH + $NaAlO_2$ content expressed in $Na_2O$.

$$\text{Molar ratio} = \frac{Na_2O_c \, g/l : 62}{Al_2O_3 \, g/l : 102})$$

Figure 2:
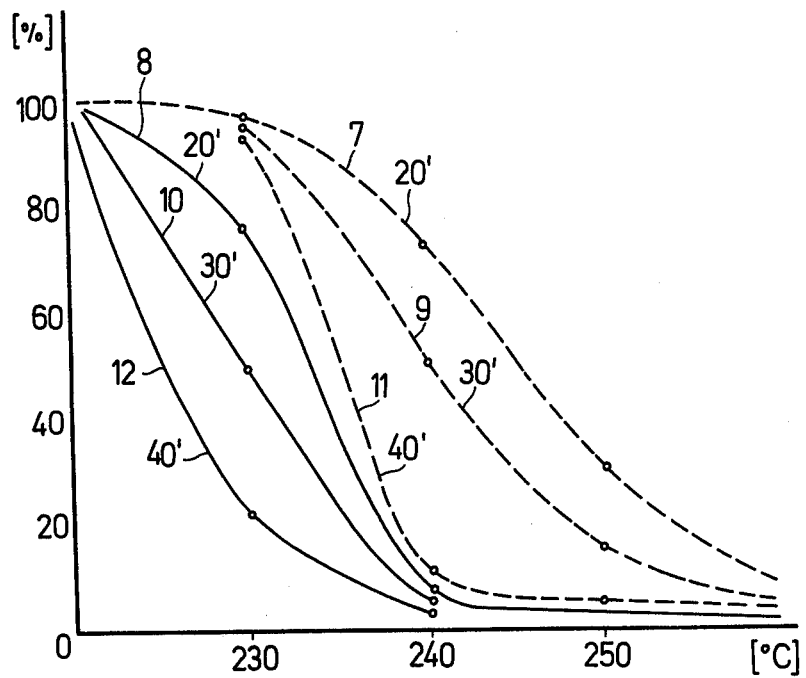
Figure 3:
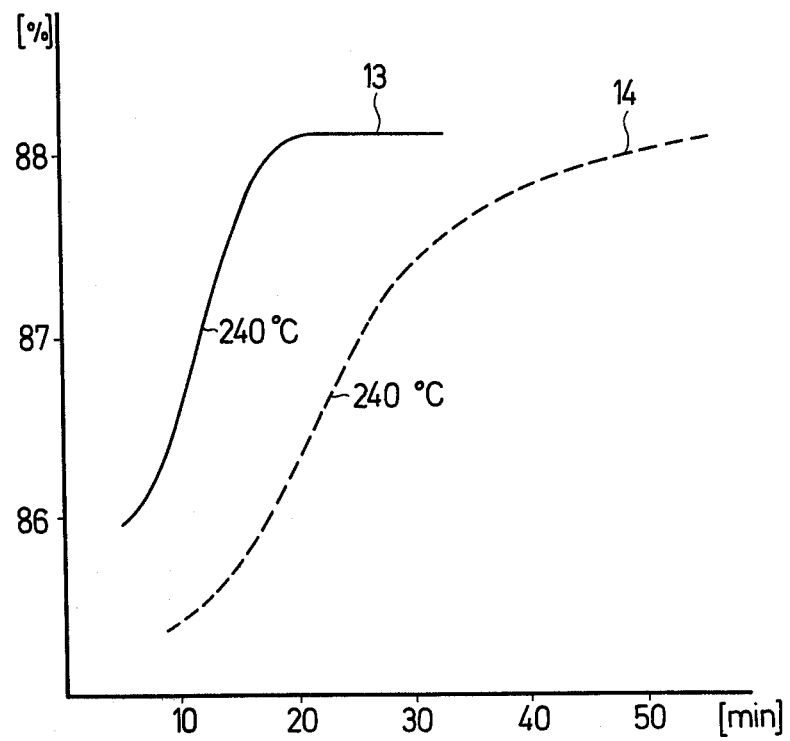

The effectiveness of the process according to the invention as compared to that of the known processes is demonstrated by means of diagrams made on the basis of our experiments. FIG. 1 illustrates the relative goethite quantity in the red mud in function of the duration of digestion at three different temperatures. FIG. 2 shows similarly the relative goethite content in the red mud but now in function of the digestion temperature, in case of three different durations of digestion. FIG. 3 introduces the $Al_2O_3$ yield in percent in function of the duration of digestion.

The parameters of the curves shown in figures are as follows:

| Curve 1: | 3 % CaO + 5 l/l $Na_2SO_4$; | 230° C |
|---|---|---|
| Curve 2: | 3 % CaO + 0.8 % $Mn^{++}$; | 230° C |
| Curve 3: | 3 % CaO + 5 g/l $Na_2SO_4$; | 240° C |
| Curve 4: | 3 % CaO + 0.8 % $Mn^{++}$; | 240° C |
| Curve 5: | 3 % CaO + 5 g/l $Na_2SO_4$; | 260° C |
| Curve 6: | 3 % CaO + 0.8 % $Mn^{++}$; | 260° C |
| Curve 7: | 3 % CaO + 5 g/l $Na_2SO_4$; | 20 minutes |
| Curve 8: | 3 % CaO + 0.8 % $Fe^{++}$; | 20 minutes |
| Curve 9: | 3 % CaO + 5 g/l $Na_2SO_4$; | 30 minutes |
| Curve 10: | 3 % CaO + 0.8 % $Fe^{++}$; | 30 minutes |
| Curve 11: | 3 % CaO + 5 g/l $Na_2SO_4$; | 40 minutes |
| Curve 12: | 3 % CaO + 0.8 % $Fe^{++}$; | 40 minutes |
| Curve 13: | 3 % CaO + 0.8 % $Mn^{++}$; | 240° C |
| Curve 14: | 3 % CaO + 5 g/l $Na_2SO_4$; | 240° C |

FIG. 1 illustrates the catalyzing effect of feeding $Mn^{++}$ and $Fe^{++}$ compound, respectively, to the transformation of goethite into hematite. The manganese ion was fed in form of hydroxide-containing manganese ore in a quantity, the manganese content expressed in $Mn^{++}$ ions of which being 0.8% reckoned upon the dry weight of bauxite. As $Fe^{++}$ compound $FeSO_4.7H_2O$ occurring as residuary product was fed in a quantity ensuring similarly 0.8% quantity expressed in $Fe^{++}$ of this compound. The $Fe^{++}$ and $Mn^{++}$ compounds were mixed together with 3% CaO reckoned upon the weight of bauxite to the bauxite to be digested (curves 2, 4, 6). For making a comparison, the results obtained in the presence of 3% CaO, in digesting liquor containing 5 g/l $Na_2SO_4$ were also introduced (curves 1, 3, 5). According to the figure, the presence of $Mn^{++}$ and $Fe^{++}$ ions, respectively, has catalyzed to a great extent the transformation of goethite into hematite at each tested temperature. Thus, e.g. in the presence of CaO + $Na_2SO_4$ the transformation was still negligible at a temperature of 230° C (curve 1), whereas when $Mn^{++}$ and $Fe^{++}$ compounds were added, the transformation occurred within 50 minutes at a high efficiency (curve 2). At a temperature of 240° C a retention time of 40 and 20 minutes, respectively, is required in the above two cases for attaining the same transformation (curves 3, 4). A considerable difference can be experienced also in case of a recovery at 260° C in which case a retention time of 20 minutes is required when adding CaO + $Na_2SO_4$ ) curve 5), whereas by the aid of $Mn^{++}$ and $Fe^{++}$ ions, respectively, practically complete transformation can be obtained at the achievement of the digestion temperature (curve 6). From this latter result it may be stated that the feeding of the above mentioned bivalent ions can be advantageously applied at the tube digestion where higher operating temperature can be achieved than with the conventional digesters.

FIG. 2 indicates, how the velocity of the transformation of goethite into hematite is modified when feeding Ca + $Na_2SO_4$ and CaO + $FeSO_4 \cdot 7H_2O$, respectively. The CaO quantity makes out 3%, $Na_2SO_4$ is fed in a quantity of 5 g/l, whereas ferrous sulfate expressed in $Fe^{++}$ is added in a quantity of 0.8% reckoned upon the weight of dry bauxite. It can be seen from the figure that in the presence of $Fe^{++}$ ions a favourable transformation efficiency can be achieved at 230° C in 40 minutes (curve 12), whereas at 235° C a retention time of 30 minutes (curve 10), at 240° C that of 20 minutes (curve 8) is sufficient. On the other hand, in the common presence of CaO + $Na_2SO_4$ a temperature of at least 240° C and a retention time of 40 minutes are required in order to achieve a favourable transformation efficiency (curve 11).

FIG. 3 shows that proportional to the goethite-hematite transformation also the alumina yield increases. Accordingly, at a temperature of 240° C a retention time of 20 minutes is sufficient in the common presence of CaO + $Mn^{++}$ for the achievement of a digestion output of 88% (curve 13), whereas the same result can be achieved similarly at a temperature of 240° C but in 50 minutes when adding CaO + $Na_2SO_4$ (curve 14).

In the Table the chemical compositions of the starting bauxite, as well as of the red muds belonging to the 20-minute recovery of curve 13 and to the 50-minute recovery of curve 14 of FIG. 3 are contained. Of the $Al_2O_3$-content of the bauxite 21.3% are bound to boehmite, 20% to gibbsite, 4.3% to kaolinite, 1.7% to diaspore and 1.9% to goethite, whereas of the $Fe_2O_3$ content 9.0% are present as goethite, 7.4% as hematite and 3.5% as maghemite. It is also obvious from the table that in the presence of CaO + $Mn^{++}$ (hydroxidic manganese ore) the specific $Na_2O$ content of the red mud formed is lower than with the feeding of CaO + $Na_2SO_4$.

The digestion was carried out with strong liquor containing 225 g/l of $Na_2O_c$ and the charging of bauxite was chosen so as to render possible that after digestion the molar ratio of the solution is higher by 0.05 value than the equilibrium molar ratio at each temperature. When feeding the above bivalent ions the settling of the red mud is further improved by 10 to 15% as compared to the settling of red mud formed during the digestion carried out in the common presence of CaO + $Na_2SO_4$, since under such conditions the crystallization degree of the formed hematite increases.

When carrying out the process according to the invention the digestion is made e.g. corresponding to the goethite content of bauxite and to the bond strength of the Al-atoms bound in the goethite, in the presence of 2-5% CaO and/or MgO, as well as 0.2-2.0% $Fe^{++}$ and/or $Mn^{++}$ and/or $Co^{++}$ reckoned upon the weight of dry bauxite. Expediently, the procedure is followed that as CaO— or MgO-containing compound burnt lime, burnt magnesite or dolomite is fed, whereas the $Fe^{++}$ and/or $Mn^{++}$ ions are mixed to the bauxite to be ground in the form of $FeSO_4 \cdot 7H_2O$ formed as inexpensive waste and in the form of oxidic, hydroxidic manganese ore, respectively. An advantageous realization method of the process according to the invention consists in that the $Mn^{++}$ content is adjusted by feeding manganese-rich bauxite and by homogeneously mixing it with the bulk of bauxite, respectively. Another advantageous realization method is for the feeding of $Fe^{++}$ ions into the system when part of the formed red mud is added to the bauxite as a partial reduction of its ferric oxide content and thus, the formation of FeO and Fe(OH)$_2$, respectively, in the digesting liquor is ensured. Although the further catalyzing effect of NaCl or $Na_2SO_4$ does not come into display in the presence of $Fe^{++}$, $Mn^{++}$ and $Co^{++}$ ions, with a view to the reduction and replacement of caustic soda losses the process can be advantageously applied also when using NaCl- and/or $Na_2SO_4$-containing digesting liquors.

The process according to the invention can be illustrated in more detail by means of the following Examples.

EXAMPLE 1

Bauxite of the composition indicated in the table was recovered, in which 9%, of the 19.9% $Fe_2O_3$ content were present as goethite and 1.7% of the $Al_2O_3$ content was diaspore. The bauxite was digested at a temperature of 240° C for 20 minutes in a caustic liquor of 3.4 molar ratio, containing 225 g/l $Na_2O_c$, in the presence of manganese ore corresponding to 3% CaO content and 0.8% $Mn^{++}$ content reckoned upon the dry weight of bauxite. After digestion the molar ratio of the obtained aluminate liquor was 1.31. The composition of the raw red mud is shown in the table. The comparative recovery was carried out under similar conditions feeding likewise 3% CaO, in a digesting liquor of similar composition, to which, however, 5 g/l $Na_2SO_4$ was fed. In this case 50 minutes of digestion time was necessary to obtain the same result as was achieved in the former case in 20 minutes. The course of digestion relating to time, the transformation of goethite into hematite included, is shown in FIG. 3. The composition of red mud formed in the second case is also indicated in the Table. The alumina yield was nearly the same in both cases, the transformation of goethite into hematite as well as the digestion of diaspore took place similarly, with the feeding of $Mn^{++}$, however, the caustic soda loss referred to the $SiO_2$ content was reduced by more than 10%. As a further advantage, the more favourable separability of red mud can be mentioned being indicated also by the change of specific surface of the red mud. While the specific surface of the red mud containing goethite was 21.5 sq.m/g, this value reduced in the presence of CaO + $Na_2SO_4$ to 9.8 sq.m/g, in the presence of CaO + $Mn^{++}$ to 8.0 sq.m/g, followed by a further increase of about 15% of the filtering capacity. The presence of $Mn^{++}$ ions thus reduced the duration of digestion (that is of the transformation of goethite into hematite) from 50 minutes to 20 minutes, and rendered possible a 10% reduction of the caustic soda loss and a 15% increase of the filtering capacity, as compared to the technology applying CaO + $Na_2SO_4$ addition.

EXAMPLE 2

Bauxite of composition similarly indicated in the Table was digested. In this case 3% CaO reckoned upon the weight of dry bauxite and $FeSO_4 \cdot 7H_2O$ corresponding to 1% $Fe_2O_3$ were added to the bauxite. The digestion was carried out in digesting liquor of 3.4 molar ratio, of 225 g/l $Na_2O_c$ content given in Example 1, but at a temperature of 230° C in 40 minutes. Under such conditions 82.0% of the original goethite content were transformed into hematite and the alumina yield was 87,8% (curve 12 shown in FIG. 2). According to curve 11, under identical conditions, the goethite was practically unchanged into the red mud in the presence of CaO + $Na_2SO_4$. The reduction of the caustic soda loss and the improvement of the settling properties were similar to those given in Example 1. In the presence of $Fe^{++}$ ions the minimum temperature necessary for the transformation of goethite into hematite could be thus reduced to 230° C as compared to the temperature of 240° C necessary for the technology applying the CaO + $Na_2SO_4$ addition.

EXAMPLE 3

The bauxite of composition given in the Table was recovered in a tube digesting equipment. To the bauxite 3% CaO reckoned upon the weight of dry bauxite and 3% reduced red mud were added, the latter being produced of the red mud of composition given in Table 1 in such a way that 70% of the $Fe_2O_3$ content were reduced to FeO in a rotary furnace in the presence of carbon. The composition of the digesting liquor was similarly 225 g/l $Na_2O_c$, with a molar ratio of 3.4. In the tube digestion equipment the slurry stayed for 2 minutes at a temperature of 260° C. Under such conditions 96% of the goethite transformed into hematite, whereas with the comparative experiment carried out in the presence of CaO + $Na_2SO_4$ the nearly identical result was obtained only after a digestion time of 20 minutes. (See curves 6 and 5 in FIG. 1.) The settling of the red mud improved, too, the increase of the filtering capacity amounted to 25% as compared with the technology applying CaO + $Na_2SO_4$ feeding, due to the formation of the excellently developed hematite crystals. The alumina yield and the caustic soda loss worked out corresponding to the values given in Example 1. Due to the catalytic effect of $Fe^{++}$ ions produced by the reduction of red mud, the digestion time could be reduced at a temperature of 260° C to one tenth of the digestion time of the technology applying CaO + $Na_2SO_4$ feeding.

EXAMPLE 4

The same procedure as in Example 3 is carried out only instead of burnt lime burnt dolomite is used obtained by roasting a dolomite rich bauxite.

EXAMPLE 5

The procedure of Example 1 is followed only instead of manganese ore bauxite contaminated with manganese is fed and mixed homogeneously with the bulk of the bauxite to be processed.

Table

Chemical composition of bauxite and red muds

| Component | Bauxite | Red mud 1 (3 % CaO + 0.8 % Mn$^{++}$) 240° C; 20 min | Red mud 2 (3 % CaO + 5 g/l Na$_2$SO$_4$) 240° C; 50 min |
|---|---|---|---|
| Fe$_2$O$_3$ | 19.9 | 43.8 | 42.5 |
| Al$_2$O$_3$ | 49.2 | 18.9 | 13.6 |
| SiO$_2$ | 5.5 | 12.2 | 12.6 |
| L.O.I. | 19.7 | 7.0 | 7.0 |
| TiO$_2$ | 2.3 | 5.4 | 5.6 |
| CaO | 1.0 | 8.8 | 8.5 |
| MgO | 0.5 | 1.2 | 1.1 |
| Mn$_3$O$_4$ | 0.1 | 2.1 | 0.2 |
| Na$_2$O | — | 6.40 | 7.44 |
| Na$_2$O%/SiO$_2$% | — | 0.524 | 0.590 |

What we claim is:

1. In a process for digesting goethite-containing bauxites according to the Bayer technology, for accelerating the digesting process, for transforming the goethite into hematite, for increasing the Al$_2$O$_3$-yield and for reducing the caustic soda losses, at a temperature of 180°–300° C, using aluminate liquor of a concentration of 80–300 g/lNa$_2$O$_c$, the improvement comprising carrying out the digestion in the presence of added amounts of 2–6% calcium oxide and 0.2–2.0% Mn$^{++}$ ions reckoned upon the weight of the dry bauxite.

* * * * *